United States Patent
Munson et al.

(10) Patent No.: US 6,741,262 B1
(45) Date of Patent: May 25, 2004

(54) EXPERT COLOR MANAGEMENT SETTINGS METHOD AND INTERFACE

(75) Inventors: Tyler Munson, San Francisco, CA (US); David Macy, Pacifica, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/570,678

(22) Filed: May 12, 2000

(51) Int. Cl.$^7$ .............. G09G 5/00; G09G 5/02; G06F 15/00
(52) U.S. Cl. .............. 345/594; 345/590; 345/593; 345/764; 345/810; 358/1.9
(58) Field of Search .............. 345/856, 764, 345/700, 866, 902, 590–591, 593, 597, 594, 604, 619, 633, 650, 805, 734–737, 762–765, 810–813, 835–838; 358/1.1, 1.12, 1.15, 1.14, 1.9, 500, 518, 520, 516, 519, 521, 523, 502, 515; 382/167, 162, 112, 100; 347/43; 430/124, 126

(56) References Cited

U.S. PATENT DOCUMENTS

| | | | |
|---|---|---|---|
| 5,060,170 A | 10/1991 | Bourgeois et al. | 364/521 |
| 5,065,347 A | 11/1991 | Pajak et al. | 395/159 |
| 5,204,947 A | 4/1993 | Bernstein et al. | 395/157 |
| 5,230,063 A | 7/1993 | Hoeber et al. | 395/156 |
| 5,237,654 A | 8/1993 | Shackelford et al. | 395/160 |
| 5,243,697 A | 9/1993 | Hoeber et al. | 395/156 |
| 5,283,864 A | 2/1994 | Knowlton | 395/158 |
| 5,297,249 A | 3/1994 | Bernstein et al. | 395/156 |
| 5,345,550 A | 9/1994 | Bloomfield | 395/156 |
| 5,347,627 A | 9/1994 | Hoffmann et al. | 395/157 |
| H1506 H | * 12/1995 | Beretta | 345/591 |
| 5,506,787 A | 4/1996 | Muhlfeld et al. | 364/474.23 |
| 5,579,446 A | * 11/1996 | Naik et al. | 358/1.9 |
| 5,588,107 A | 12/1996 | Bowden et al. | 395/344 |
| 5,627,950 A | * 5/1997 | Stokes | 345/141 |
| 5,649,220 A | 7/1997 | Yosefi | 395/788 |

(List continued on next page.)

FOREIGN PATENT DOCUMENTS

| | | | |
|---|---|---|---|
| EP | 640 941 A2 | 3/1995 | G06T/17/60 |
| EP | 640 941 A3 | 3/1996 | G06T/11/60 |
| EP | 809 176 A2 | 11/1997 | G06F/3/12 |
| EP | 838 342 A2 | 4/1998 | B41J/11/48 |
| EP | 0 882 580 A2 | 12/1998 | |
| EP | 838 342 A3 | 2/1999 | B41J/11/48 |
| EP | 912 041 | 4/1999 | H04N/1/60 |
| EP | 809 176 A3 | 7/1999 | G06F/3/12 |
| EP | 1102478 A2 * | 5/2001 | H04N/1/60 |
| JP | 2002086688 * | 3/2002 | B41F/31/02 |

*Primary Examiner*—Kee M. Tung
*Assistant Examiner*—Wesner Sajous

(57) ABSTRACT

A method and interface for displaying and configuring color management settings for printing devices is provided. The user interface provides a graphical representation of the color workflow as it takes place on the printing device. From the user interface, the user configures various page elements and color models; such as RGB, CMYK, Spot Color and Black using pull down menus of options and other interface elements. Available options include color space transformations, color corrections and printing methods. Interface mapping changes in real time to reflect the user's modifications to the color management settings at the various points of the workflow. In a network environment providing bi-directional communication between workstations and network peripherals, the color management tool queries the printing device and dynamically builds the user interface according to the unique characteristics and capabilities of the printing device; if bi-directional communication is not available, the interface is built from generic options. Thumbnail images, also updated in real time, provide previews of the output. The invention may also take the form of a computer program product on a computer-usable storage medium having computer-usable program code means embodied in the medium.

45 Claims, 10 Drawing Sheets

U.S. PATENT DOCUMENTS

| | | | |
|---|---|---|---|
| 5,699,494 A | | 12/1997 | Colbert et al. ............... 395/114 |
| 5,704,021 A | * | 12/1997 | Smith et al. ................. 358/502 |
| 5,717,439 A | | 2/1998 | Levine et al. ............... 345/353 |
| 5,726,883 A | | 3/1998 | Levine et al. ............... 364/188 |
| 5,784,059 A | | 7/1998 | Morimoto et al. .......... 345/353 |
| 5,784,177 A | | 7/1998 | Sanchez et al. ............. 358/468 |
| 5,787,275 A | | 7/1998 | Li ............................... 395/614 |
| 5,815,764 A | | 9/1998 | Tomory ......................... 399/1 |
| 5,818,450 A | | 10/1998 | Katsuta ....................... 345/352 |
| 5,832,298 A | | 11/1998 | Sanchez et al. ............. 395/828 |
| 5,859,640 A | | 1/1999 | de Judicibus ............... 345/347 |
| 5,867,169 A | | 2/1999 | Prater ......................... 345/431 |
| 5,870,771 A | | 2/1999 | Oberg ......................... 707/502 |
| 5,874,988 A | | 2/1999 | Gu ............................... 348/97 |
| 5,876,131 A | | 3/1999 | Parker et al. ................ 400/279 |
| 5,903,269 A | | 5/1999 | Poreh et al. ................. 345/346 |
| 5,905,496 A | | 5/1999 | Lau et al. .................... 345/339 |
| 5,907,495 A | | 5/1999 | Snyder et al. ............... 364/578 |
| 5,956,015 A | * | 9/1999 | Hino .......................... 345/600 |
| 5,985,474 A | | 11/1999 | Chen et al. .................... 429/17 |
| 5,999,703 A | * | 12/1999 | Schwartz et al. ............ 358/1.9 |
| 6,040,927 A | * | 3/2000 | Winter et al. ............... 358/531 |
| 6,301,586 B1 | * | 10/2001 | Yang et al. ............... 707/104.1 |
| 6,421,141 B2 | * | 7/2002 | Nishikawa .................. 358/1.9 |
| 6,453,078 B2 | * | 9/2002 | Bubie et al. ................ 382/305 |
| 6,459,501 B1 | * | 10/2002 | Holmes ....................... 358/1.9 |
| 6,483,607 B1 | * | 11/2002 | Van de Capelle et al. ... 358/1.9 |
| 6,542,634 B1 | * | 4/2003 | Ohga ......................... 382/167 |

* cited by examiner

EXPERT COLOR MANAGEMENT SETTINGS METHOD AND INTERFACE

BACKGROUND OF THE INVENTION

1. Field of the Invention

The invention relates to the field of graphical user software interfaces. More particularly, the invention relates to a method and user interface for displaying and configuring expert color management settings for printing devices in a computing environment.

2. Description of the Prior Art

In digital environments, the printing of color output having consistent, predictable color requires color management throughout the workflow. Color management in digital environments is necessary because different devices in the workflow have different color spaces, and they all must be calibrated to each other. Various methods and systems for automated color management are known. For example, Gu, U.S. Pat. No. 5,874,988 ("Gu") discloses a system and method for correcting color in video images. The image is captured from a video or a telecine frame, for example, by creating a digital copy of the image, and the copy is sent to an image analyzer. An operator views selected areas of the image and applies various color corrections in the RGB channels. The corrected image is saved to a storage medium such as a videotape or a computer mass storage device. The Gu teachings have nothing to do with color models other than RGB, and they have nothing to do with color space transformations. Furthermore, they don't deal with sending output to a color printing device. It would be advantageous to provide a means of color management that allowed color correction in additional color models, and allowed color space transformation, and configuration of various printing options.

Interfaces to color management tools usually require the user to set multiple parameters and make several adjustments. Complicated user interfaces may frustrate and confuse the user. Thus, the user is unable to attain maximum benefit from a software tool, because much of the tool's functionality is not readily accessible. Graphical interfaces help to dispel some of the user's confusion. Sanchez, et al. U.S. Pat. No. 5,784,177 and Sanchez, et al. U.S. Pat. No. 5,832,298 describe a graphical user interface for configuring and operating networked output devices such as printers and fax machines. The interface includes an image of the device being configured. As the user modifies settings, the device image changes to reflect the user's modifications. Neither of the Sanchez patents is directed to color management in any way.

Color management interfaces displaying different paths for the various elements of a source color space are known in the art. Such interfaces are of limited usefulness because they only permit the setting of system wide defaults rather than adjusting color management settings on a per job basis, and they do not permit the user to select a desired color management profile from a list of profiles. Such interfaces are also incapable of dynamically updating to reflect the color management capabilities of different output devices. Furthermore, such interfaces cannot be deployed in networked computing environments.

Consequently, there is a need in the art to provide a method of displaying and modifying expert color management settings such as color corrections, color space transformations, and printing options in a simple, graphical format. It would be advantageous to provide a graphical user interface that displays the color management settings as a representation of a color workflow. It would also be advantageous to dynamically update the workflow representation in response to actions by a user. It would be a further advantage to provide a color management interface that allowed the user to adjust color management settings on a per job basis and to display lists of color profiles that are dynamically updated.

SUMMARY OF THE INVENTION

A method and graphical user interface for displaying and configuring color management settings for printing devices in networked computing environments is provided in which the task of expert level color management is greatly simplified. The user interface includes a dynamic representation of a color workflow as it takes place on the printing device. The color workflow includes paths corresponding to the various source elements such as RGB, CMYK, Spot Color and Black. Available color management settings include: color space transformations, color corrections and printing methods; the user modifies the color management settings from pull down menus of options, radio buttons and other switches. As the user modifies the color management settings, the interface mapping is updated to show available options and current output paths in real time, according to the modifications. Thumbnail images, updated in real time allow the user to preview the output as modifications are made to the color settings. In a network environment providing bi-directional communication between workstation and peripherals, the color management tool queries the printing device and builds the user interface according to the unique capabilities and attributes of the printing device; if bi-directional communication is not available, the interface is built from generic options. The invention may also take the form of a computer program product on a computer-usable storage medium having computer-usable program code means embodied in the medium.

DETAILED DESCRIPTION

Color workflow in the digital environment has necessitated the development of methods of color management, in which the color spaces of the various components of the workflow are calibrated to one another, thereby enabling the accurate, predictable reproduction of color. Color management at the expert level involves multiple parameters, including those of color correction, color space transformations and conversions, color separations, and output methods. Herein below is presented a method and interface for displaying and configuring expert color management settings.

Figure 1:
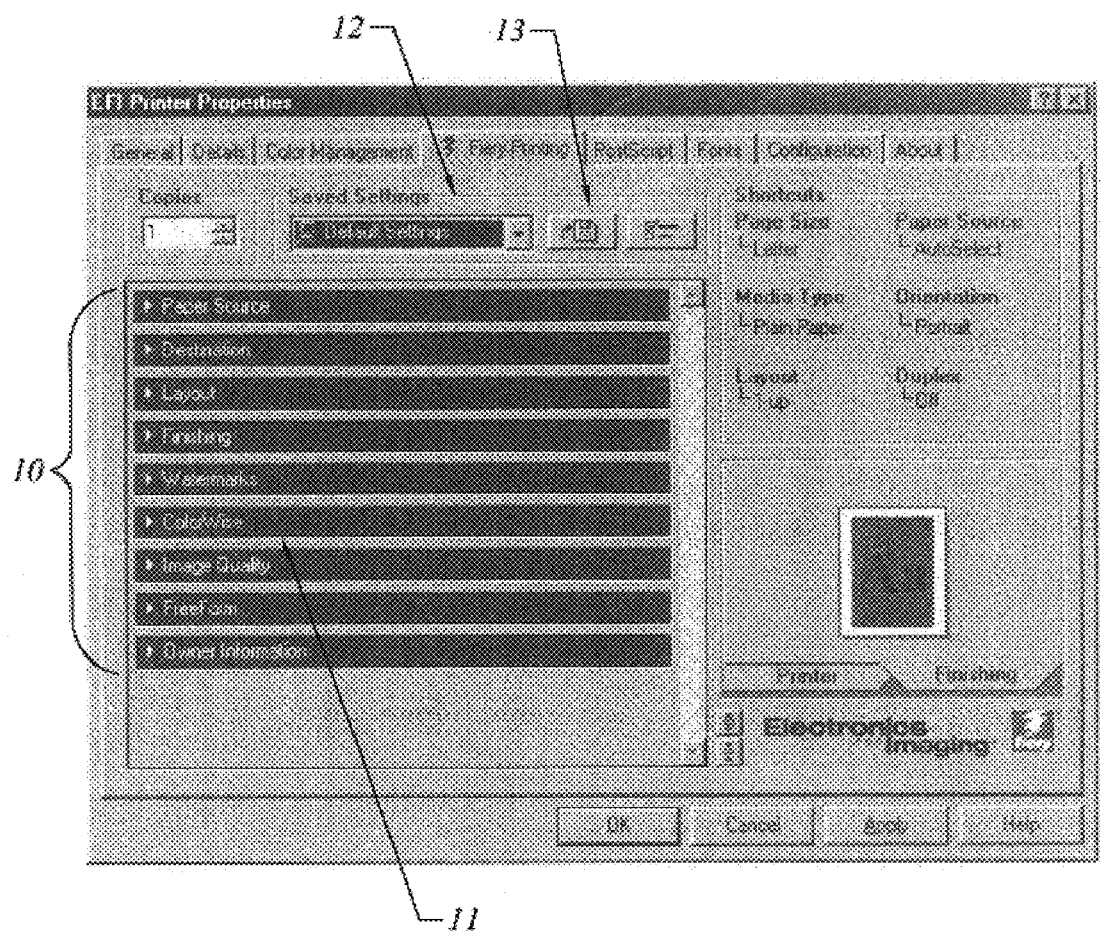
FIG. 1 shows a menu of feature categories from which access to a color management settings interface is gained.
Figure 2:
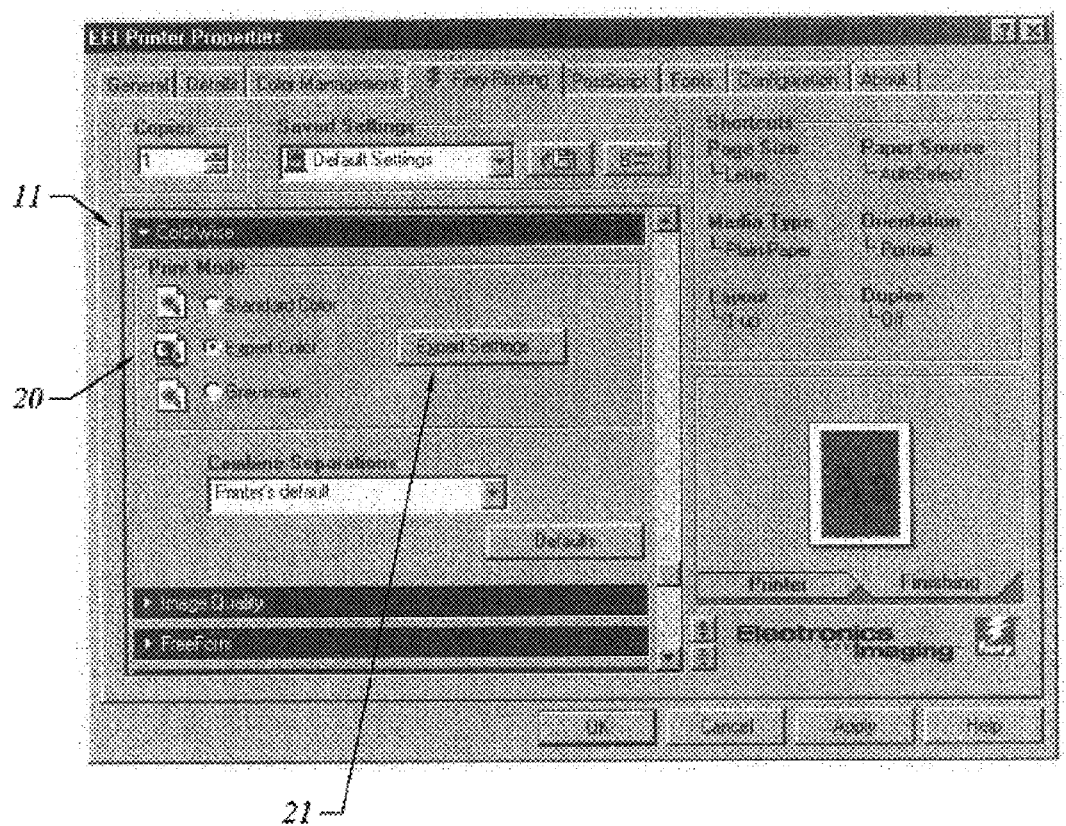
FIG. 2 shows an expanded menu of color management options, from which access to an expert color management settings interface is gained.

Turning now to the Figures, FIG. 1 shows the user interface of a printing device controller with a menu of feature categories 10 displayed. The user accesses the individual features by mouse-clicking the category bar. Among the feature category bars is a bar for accessing a color management feature 11. Referring now to FIG. 2, mouse-clicking the feature category bar 11 expands the feature category, so that all settings within the category are displayed to the user. The color management feature provides two color management options: standard color and expert color 20.

Figure 3:
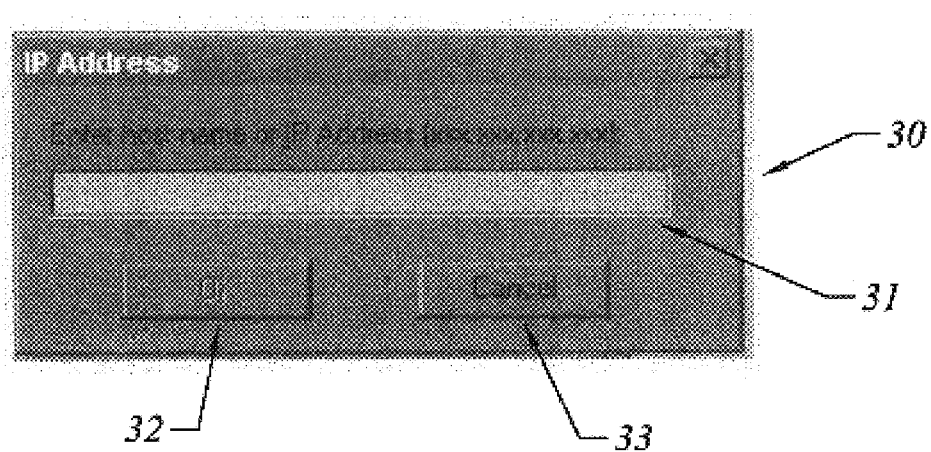
FIG. 3 shows a dialog box for specifying the network address of a printing device, according to the invention.

Access is gained to the expert color management settings interface from the color management dialog. In the current embodiment, the user mouse-clicks the 'Expert Settings' button 21. In response to this user action, a dialog box 30 is launched, as shown in FIG. 3, having a data entry field 30 in which the user enters a network address of a printing device. In network environments wherein a network protocol is employed permitting bi-directional communication between workstations and network peripheral devices, supplying the network address and mouse-clicking the 'OK' button 32 queries the specified printing device. The printing device may also be specified through an automated network find. In response to the query, the printing device returns information relating to its color management capabilities and default configuration. As described further below, the information is utilized to dynamically generate an expert color management settings interface unique to the specified printing device, in which the displayed color management settings and the options menus are customized to the printing device. In the case of a network that doesn't permit bi-directional communication between workstation and peripherals, a generic interface is generated, having menus of generic options. The printing device information is stored on a network server. When the user provides the address of a printing device, the query is directed to the network server; the server returns the information and the color management settings and options menus are mapped to the generic interface. In this way, the user interface is still able to provide options specific to a particular printing device. For example, if a printing device 'A' offers RGB Separation and a second printing device 'B' does not; when connecting to device 'A,' the interface displays RGB Separation, but when connecting to device 'B,' RGB Separation is not displayed.

Figure 4:
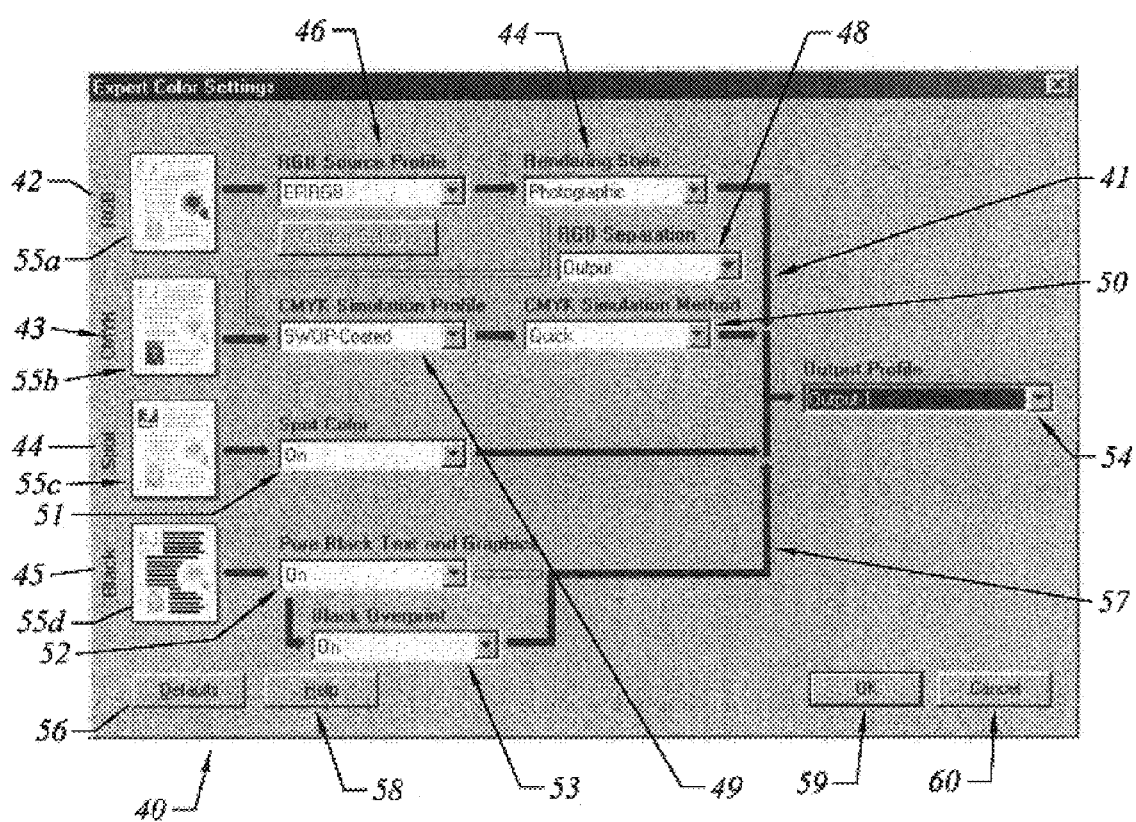
FIG. 4 shows an expert color management settings user interface, according to the invention.

FIG. 4 shows a view of an exemplary expert color management settings interface. A workspace 40 is provided. In a typical computing environment offering a windowed user interface, the workspace is a dialog box wherein the selections of options relating to the available color management settings are grouped. Directional arrows 57 map the settings and the corresponding menus into a graphical representation of a color workflow 41 as it occurs at the printing device. As described below, the workflow mapping is dynamically updated as the user modifies the color management settings. The workflow includes a series of paths, in which each path corresponds to one or more individual page elements or color models by which the source is characterized. The exemplary embodiment provides the following paths:

1. RGB 42;
2. CMYK 43;
3. Spot 44; and
4. Black 45.

The above are exemplary only. Other source attributes and color models will be apparent to those skilled in the art of color management. Within each path, settings are provided in a sequence mirroring a color workflow. In order to produce a final output in which the color is consistent with that of the source, the user selects options from pulldown menus corresponding to each color management setting.

The RGB path provides the following settings:

1. RGB Source Profile 46;
2. Rendering Style 44; and
3. RGB Separation 48.

The Black path provides:

1. Pure Black Text and Graphics 52; and
2. Black Overprint 53.

Finally, a menu of Output Profiles 54 is provided in which the user may select a color space for the printing device.

As previously stated, the options menus may be customized according to the capabilities of the printing device specified, so the options may vary in real time. Additionally, an individual with administrative rights may define custom capabilities for a printing device. However, certain menus remain relatively constant across the range of printing devices.

Below is an exemplary listing of menu options for the various settings.

RGB Source Profile:
1. EFIRGB
2. SRGB
3. Apple Standard
4. Custom
5. Other

Rendering Style:
1. Photographic
2. Presentation
3. Relative Colorimetric
4. Absolute Colorimetric RGB Separation:
1. Output
2. Simulation CMYK Simulation Profile:
1. Custom
2. SWOP-Coated
3. Euroscale
4. DIC CMYK Simulation Method:
1. Quick
2. Full Spot Color:
1. On
2. Off Pure Black Text and Graphics:
1. On
2. Off Black Overprint
1. On
2. Off Output Profile 1. Output profiles are completely specific to the state of the printing device, which varies according to paper selection, ink selection and other factors which will be apparent to those skilled in the art.

Several of the menus typically contain additional generic menu items that are customized by mapping them to printer device characteristics, as previously described, or by querying the printer device, in the case of a network environment providing bi-directional communication. Additionally, the color management settings displayed may vary according to the characteristics and capabilities of the printing device. For example, not all printing devices support 'Black Overprint.' Therefore, if such a print device is selected, 'Black Overprint' does not appear on the interface at all.

Figure 5:
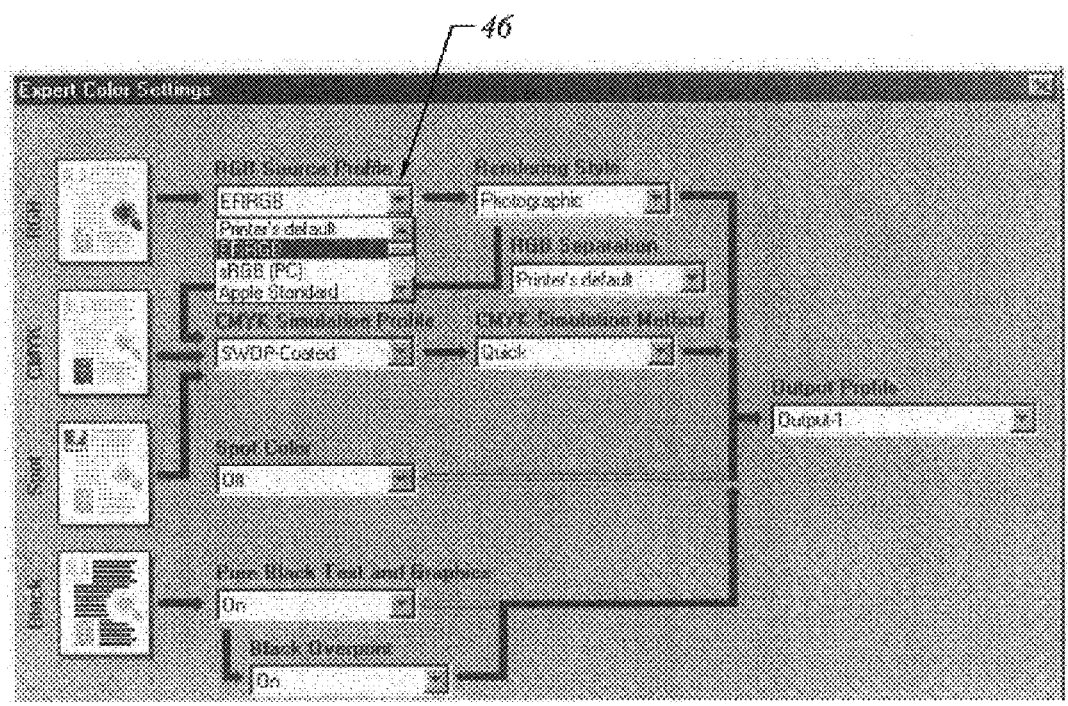
FIG. 5 shows a pull down menu of RGB Source Profile options in the user interface of FIG. 4, according to the invention.
Figure 6:
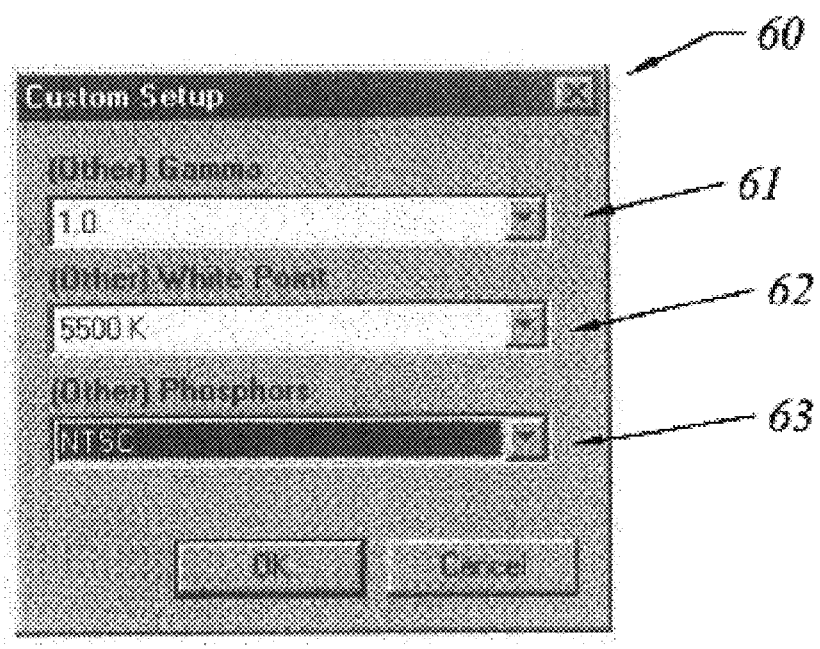
FIG. 6 shows a dialog box for creating a custom RGB Source Profile, according to the invention.

FIG. 5 shows the method of interacting with the various color management settings. Each color management setting, in this case RGB Source Profile 46, has associated with it a pulldown menu of options. In order to modify a color management setting, the user mouse-clicks the 'down' arrow of the pulldown. A menu of options drops down and the user chooses an option by selecting it with the cursor. Additionally, certain settings provide the capability of configuring custom options. For example, FIG. 6, shows a 'Custom Setup' dialog box 60, in which the user may configure a custom RGB Source Profile by specifying a Gamma value 61, a White Point value 62 and a Phosphors value 63. In a similar manner, the user is able to configure a custom Output Profile. Referring again to FIG. 4, the interface provides a thumbnail image 55a–d associated with each path to provide a preview of the output. As the color management settings are modified, the thumbnails are dynamically updated, thus providing the user with valuable feedback as they interact with the invented interface.

The expert color management settings interface provides additional controls and interface elements:

1. 'Defaults' button 56—mouse-clicking the 'Defaults' button restores all setting to their default values.
2. 'Help' button 58—accesses user Help.
3. 'OK' button 59—applies the modifications to the color management settings and returns the user to the print device controller interface.
4. 'Cancel' button 60—cancels the modifications and returns the user to the print device controller interface.

Figure 7:
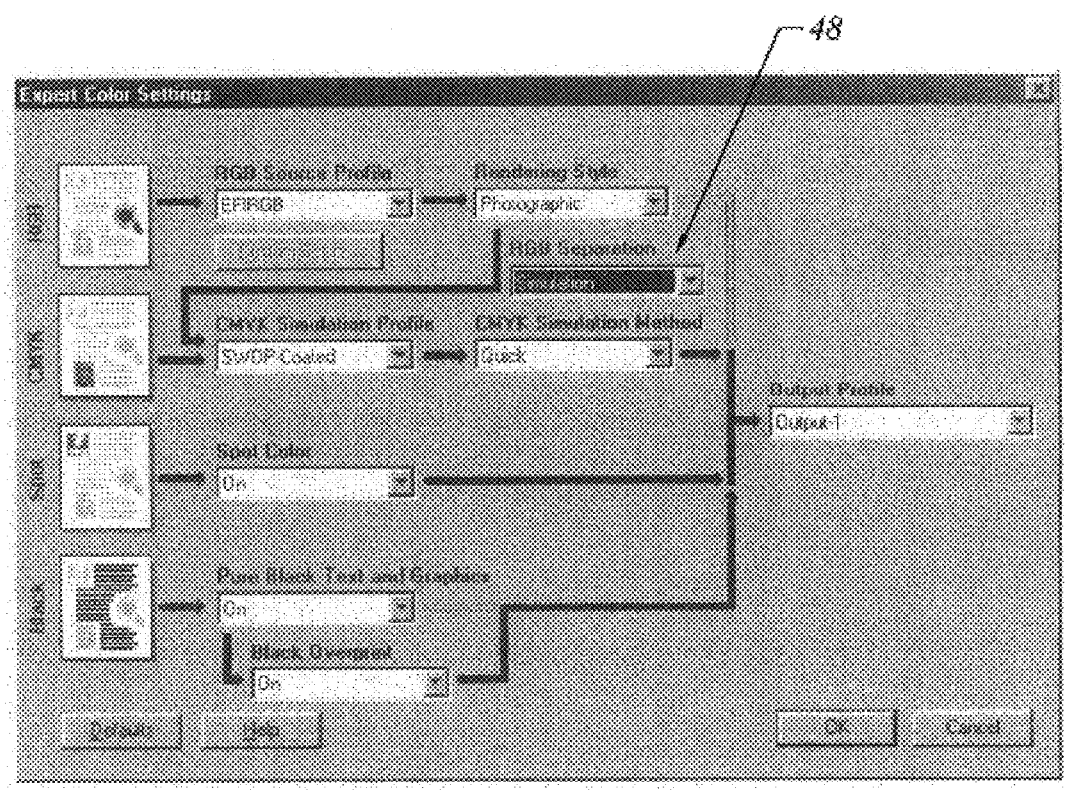
FIG. 7 shows the user interface of FIG. 4 with a different RGB separation option selected, according to the invention.

As previously described, the mapping of the workflow representation is dynamically updated in response to user actions modifying the color management settings. FIGS. 7–10 illustrate this feature of the invention. FIG. 7 shows the interface of FIG. 4 with the RGB Separation modified from 'Output' to 'Simulation.' Referring to FIG. 4, with RGB Separation set to 'Output,' RGB values are sent directly to output, thus a directional arrow maps RGB values directly to the Output Profile 54. Referring now to FIG. 7, RGB Separation is set to 'Simulation,' thus RGB values must be converted to CMYK values and mapped to CMYK Simulation Profile. The arrow mapping RGB values to Output Profile is grayed-out, and a second arrow maps RGB values to CMYK Simulation Profile.

Figure 8:
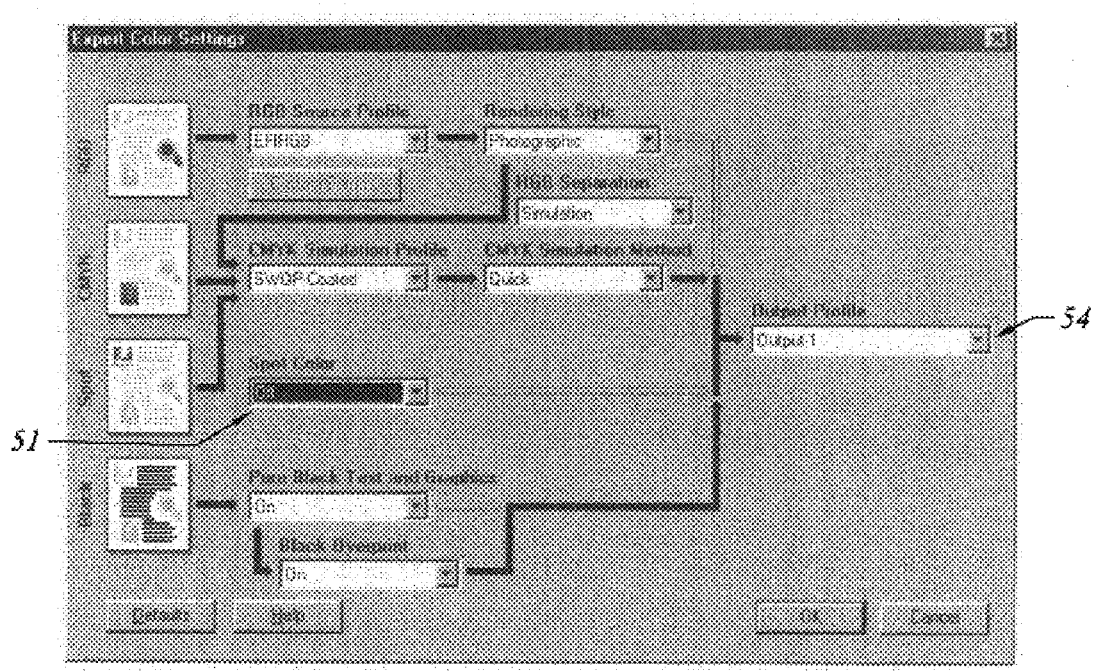
FIG. 8 shows the user interface of FIG. 7 with a Spot Color option set to 'Off,' according to the invention.

FIG. 8 shows Spot Color 51 set to 'Off,' therefore Spot Color values are not output directly, but first converted to CMYK values, so the arrow mapping Spot Color to Output Profile 54 is grayed out and another arrow maps Spot Color values to CMYK Simulation Profile.

Figure 9:
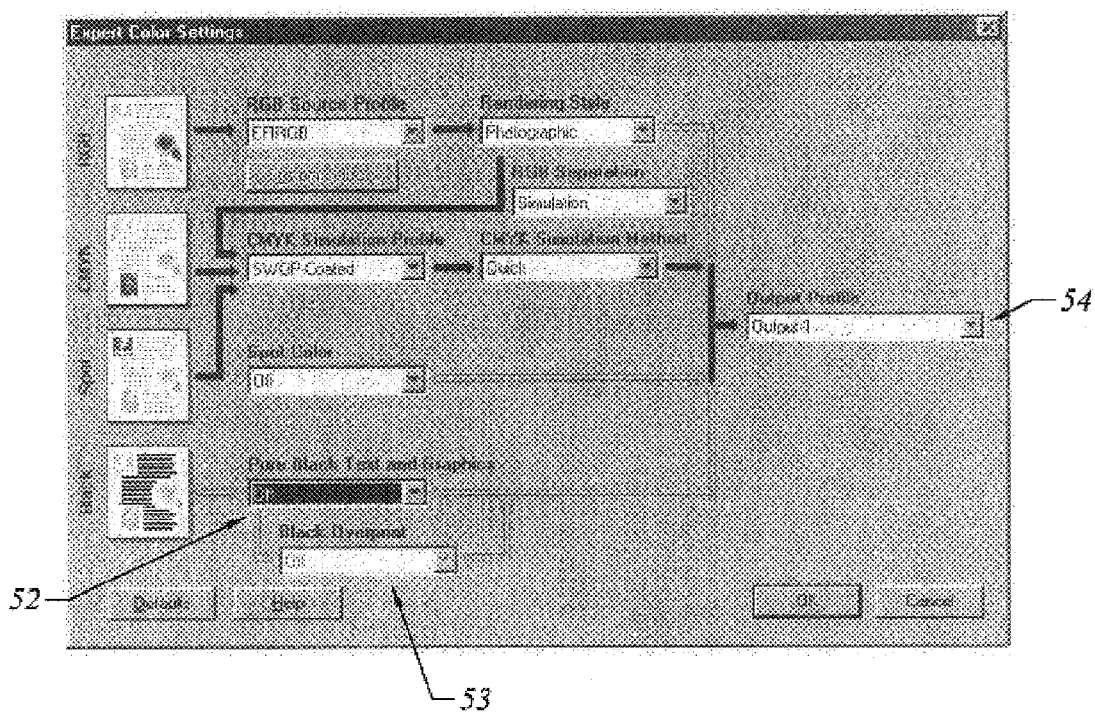
FIG. 9 shows the user interface of FIG. 7 with a Pure Black Text and Graphics option set to 'Off,' according to the invention.

FIG. 9 shows Pure Black Text and Graphics 52 set to 'Off.' Therefore, black values are not output directly, and the arrow mapping Pure Black Text and Graphics to Output Profile 54 is grayed-out. Black need not be converted to CMYK values, because the CMYK color model includes a black channel, therefore no mapping to CMYK Simulation Profile is shown. It will be noticed that Black Overprint 53 is set to 'Off' by default when Pure Black Text and Graphics is set to 'Off.'

Figure 10:
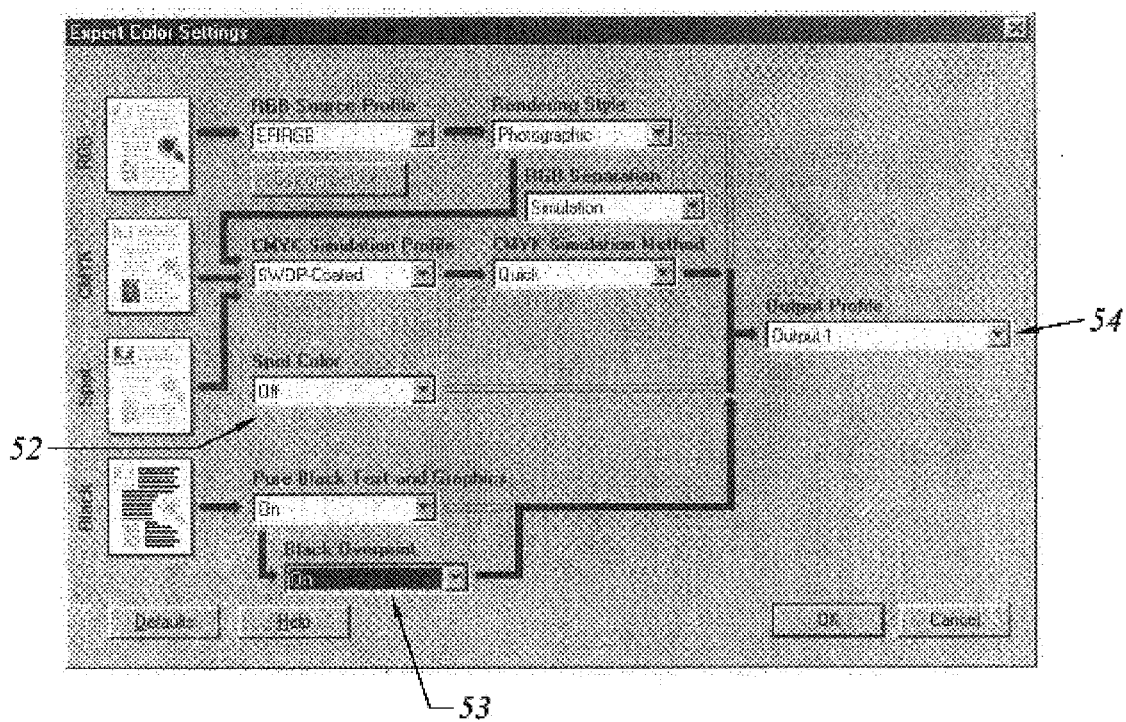
FIG. 10 shows the user interface of FIG. 7 with a Pure Black Text and Graphics option set to 'On' and a Black overprint option set to 'On,' according to the invention.

FIG. 10 shows Pure Black Text and Graphics 52 and Black Overprint 53 both set to 'On.' Thus mapping goes from 52 to 53 to 54. However if Black Overprint were 'Off,' mapping would proceed from 52 to 54.

All of the mapping changes described in the foregoing paragraphs occur in real time. That is, the mapping is dynamically updated as the user modifies the color management settings.

Referring again to FIG. 2, a button 13 is provided whereby the current configuration of color management settings may be saved. The saved configuration appears in a pulldown menu 12 of saved configurations, and may be selected from the menu at a future time.

The invention may be embodied as a method and as a user interface. The foregoing description is directed to an exemplary embodiment of the invention. Multiple embodiments of the invented interface and the method of the invention are possible, according to the computing environment in which the invention is employed and the printing device specified. Furthermore, the invention may also be embodied as a computer program product on a computer-usable storage medium having computer-usable program means embodied in the medium. Any suitable computer readable medium may be used, including hard drives, CD-ROM's and other removable media, optical storage devices, or magnetic storage devices.

Although the invention is described herein with reference to certain preferred embodiments, one skilled in the art will readily appreciate that other applications may be substituted for those set forth herein without departing from the spirit and scope of the present invention. Accordingly, the invention should only be limited by the claims included below.

What is claimed is:

1. A method comprising:

providing a plurality of color management settings for a printing device and a plurality of user-settable options associated with each setting;

displaying said settings and said options in a user interface according to the color management capabilities of the printing device, wherein said interface comprises a graphical representation of a plurality of paths, wherein each path comprises the color management settings of a corresponding color workflow between a page element attribute and an output profile of the printing device;

accessing said user interface;

modifying a setting in a path; and updating said graphical representation in real time to reflect said modified setting.

2. The method of claim 1, wherein an interactive interface element associated with a setting displays the plurality of options associated with said setting and allows a user to set an option.

3. The method of claim 2, wherein said interactive interface element comprises any of pulldown menus, radio buttons and other switches.

4. The method of claim 1, wherein providing comprises providing a default configuration of said printing device.

5. The method of claim 1, wherein providing comprises:
providing generic options; and
mapping said generic options to capabilities of the printing device.

6. The method of claim 1, wherein said color workflows comprise RGB, CMYK, Spot and Black.

7. The method of claim 1, wherein said color management settings comprise any of color space transformations, color corrections and printing methods.

8. The method of claim 1, wherein said color management settings comprise RGB Source Profile, Rendering Style and RGB Separation.

9. The method of claim 8, wherein a custom RGB Source Profile is settable by providing individual values for Gamma, white point and phosphors.

10. The method of claim 1, wherein said color management settings comprise CMYK Simulation Profile and CMYK Simulation Method.

11. The method of claim 1, wherein said color management settings comprise Spot Color.

12. The method of claim 1, wherein said color management settings comprise Pure Black Text and Graphics and Black Overprint.

13. The method of claim 1, wherein said color management settings comprise Output Profile.

14. The method of claim 1, further comprising:
previewing thumbnail images of the output; and
sending said output to the printing device.

15. The method of claim 1, further comprising:
saving a configuration of color management settings; and
selecting a saved configuration of color management settings from a menu of saved configurations at a future time.

16. A graphical user interface comprising:
a workspace;
interface elements arranged within said workspace for displaying a plurality of color management settings and a plurality of user settable options associated with each setting according to the color management capabilities of a printing device, wherein said interface elements form a graphical representation of a plurality of paths, wherein each path comprises the color management settings of a corresponding color workflow between a page element attribute and an output profile of the printing device; and
means for modifying a setting in a path, wherein said graphical representation is updated in real time to reflect said modified setting.

17. The user interface of claim 16, wherein said modifying means comprises a pulldown menu associated with a setting, said pulldown menu displaying a menu associated with said setting.

18. The user interface of claim 16, further comprising a dialog box that may be used to input a network address for said printing device, so that said printing device is queried for its capabilities and its default configuration.

19. The user interface of claim 17, wherein said menu is updated in real time to reflect capabilities of said printing device.

20. The user interface of claim 16, wherein said printing device capabilities are mapped to generic menu options.

21. The user interface of claim 16, wherein said paths comprise RGB, CMYK, Spot and Black.

22. The user interface of claim 16, wherein said color management settings comprise any of color space transformations, color corrections, and printing methods.

23. The user interface of claim 16, wherein said color management settings comprise RGB Source Profile, Rendering Style and RGB Separation.

24. The user interface of claim 23, further comprising a dialog box, wherein a custom RGB Source Profile is settable by providing individual values for Gamma, white point, and phosphors.

25. The user interface of claim 16, wherein said color management settings comprise CMYK Simulation Profile and CMYK Simulation Method.

26. The user interface of claim 16, wherein said color management settings comprise Spot Color.

27. The user interface of claim 16, wherein said color management settings comprise Pure Black Text and Graphics and Black Overprint.

28. The user interface of claim 16, wherein said color management settings further comprise Output Profile.

29. The user interface of claim 16, further comprising directional arrows that represent workflow direction.

30. The user interface of claim 16, further comprising:
means for sending the output to the printing device.

31. The user interface of claim 16, further comprising means for saving a configuration of said color management settings.

32. The user interface of claim 16, further comprising an interface element, wherein a user may restore all settings to their default option.

33. A computer program product comprising a computer usable storage medium having computer readable program code means embodied in the medium, the computer code means comprising:
computer readable program code means for providing:
a workspace;
interface elements arranged within said workspace for displaying a plurality of color management settings and a plurality of user settable options associated with each setting according to the color management capabilities of a printing device, wherein said interface elements form a graphical representation of a plurality of paths, wherein each path comprises the color management settings of a corresponding color workflow between a page element attribute and an output profile of the printing device; and
means for modifying a setting in a path, wherein said graphical representation is updated in real time to reflect said modified setting.

34. The computer program product of claim 33, further comprising computer readable program code means for providing a dialog box, wherein a user specifies said print device by inputting a network address for said device, so that said device is queried for its capabilities and its default configuration.

35. The computer program product of claim 34, further comprising computer readable program code means for updating said plurality of options in real time to reflect capabilities of said device, and updating said graphical representation to said default configuration of said device in real time.

36. The computer program product of claim 34, further comprising computer readable program code means for mapping printing device capabilities to generic menu options.

37. The computer program product of claim 34, further comprising computer readable program code means for specifying said printing device through an automated network discovery.

38. The computer program product of claim 34, wherein said paths comprise RGB, CMYK, Spot, and Black.

39. The computer program product of claim 38, wherein said paths provide a plurality of color management settings, said color management settings comprising any of color space transformations, color corrections, and printing methods.

40. The computer program product of claim 39, wherein color management settings provided in said RGB path include RGB Source Profile, Rendering Style, and RGB Separation.

41. The computer program product of claim 40, further comprising computer readable code means for providing a dialog box, wherein a custom RGB Source Profile is settable by providing individual values for Gamma, white point, and phosphors.

42. The computer program product of claim 39, wherein color management settings provided in said CMYK path include:

CMYK Simulation Profile; and

CMYK Simulation Method.

43. The computer program product of claim 39, wherein color management settings provided in said Spot path include Spot Color.

44. The computer program product of claim 39, wherein color management settings provided in said Black path include Pure Black Text and Graphics and Black Overprint.

45. The computer program product of claim 44, further comprising computer readable program code means for providing directional arrows to map said paths, said arrows proceeding from one setting to a next in a path, so that direction of arrows represents workflow direction, and wherein said mapping changes in real time to show available settings and current output paths.

* * * * *